United States Patent [19]

Toyokura

[11] Patent Number: 5,385,083
[45] Date of Patent: Jan. 31, 1995

[54] PRODUCTION PLANT FOR CEREAL POWDER

[75] Inventor: Yasuhiro Toyokura, Kanagawa, Japan

[73] Assignee: Kurarich Co. Ltd., Kanagawa, Japan

[21] Appl. No.: 240,315

[22] Filed: May 10, 1994

[30] Foreign Application Priority Data

May 17, 1993 [JP] Japan .................. 5-114438

[51] Int. Cl.⁶ .............. B02B 5/00; B02C 4/00; B02C 4/06
[52] U.S. Cl. .............. 99/355; 99/357; 99/470; 99/483; 99/484; 241/68; 241/101.5
[58] Field of Search .............. 99/339, 348, 352–356, 99/443 R, 443 C, 470, 483, 484, 513, 516, 536; 426/455–464, 468, 473, 622; 34/127, 129, 132; 241/62, 68, 101.2, 101.5; 209/234, 238

[56] References Cited

U.S. PATENT DOCUMENTS

| | | | |
|---|---|---|---|
| 2,101,417 | 12/1937 | Waldvogel | 99/355 |
| 2,358,827 | 9/1944 | Rakowsky et al. | 99/483 |
| 2,487,162 | 11/1949 | Meyer et al. | 99/516 |
| 3,117,868 | 1/1964 | Madrazo et al. | 426/622 |
| 3,369,908 | 2/1968 | Gonzalez et al. | 426/622 |
| 4,089,259 | 5/1978 | Stickle et al. | 241/101.5 |
| 4,344,975 | 8/1982 | Seiler | 426/455 |
| 4,817,516 | 4/1989 | Chikarashi | 99/484 |
| 5,033,371 | 7/1991 | Satake et al. | 99/484 |
| 5,094,156 | 3/1992 | Norille | 99/516 |
| 5,101,717 | 4/1992 | Manser et al. | 99/486 |

Primary Examiner—Timothy F. Simone
Attorney, Agent, or Firm—Wenderoth, Lind & Ponack

[57] ABSTRACT

A cereal powder production plant includes a device for washing and measuring cereal material, a device for roasting the cereal material passed through the washing and measuring device, and a device for separating and screening carbonized substance generated during the roasting process in the roasting device from the roasted cereal. The roasting device is connected to the separating and screening device by a device for feeding the roasted cereal material. A crushing device crushes the cereal material separated and screened by the separating and screening device, and the separating and screening device is connected to the crushing device by a device for feeding the roasted material from which the carbonized substance is removed.

22 Claims, 5 Drawing Sheets

PRODUCTION PLANT FOR CEREAL POWDER

BACKGROUND OF THE INVENTION

1. Field of the Invention

The present invention relates to a cereal powder production plate.

2. Description of the Related Art

In general, for producing cereal powder by processing rice, wheat, corn, beans and so forth, cereal materials are initially washed and then processed through measuring, roasting and crushing steps to obtain the powder of the cereal. Then, the cereal powder is taken out as a product. However, these process steps are conventionally established as independent processes.

In the typical process in production of the cereal powder, a washing and measuring process is performed initially. The weight of the cereal material is measured, at first on a platform scale. Thereafter, the measured cereal is placed in a container of stainless steel or so forth for washing and is dipped into water. Then, the cereal is transported to the next step for the roasting process. The operations set forth above, i.e. placing of the cereal material on the platform scale, dipping of the container for washing the cereal material into water, and transporting to the next roasting process station, are generally performed manually except for a part of the transporting step, in which a transporting machine is employed.

Also, in a process of separation and screening of the roasted cereals, carbonized cereal (burnt cereal) produced during the roasting process must be removed by manual operation with visual observation.

Furthermore, in the process for crushing the roasted cereal to form the cereal powder, it is typical to mechanically crush the cereal by means of a crushing machine, such as a mill or so forth, and to drop the resultant powder into a collecting container. In such case, frictionally generated heat during the process of crushing the cereal increases the temperature of the cereal powder to be higher than that before processing by an extent of over 30° C., thereby potentially causing variation of nutritive substances contained in the cereals. Therefore, as a preparatory process for the crushing process, the cereals passed through the roasting process and the separating and screening process are preliminarily cooled in a cooling facility.

In the prior art arrangement set forth above, various problems are encountered. For instance, in the process of washing and measuring of the cereal material, the operation of loading and unloading the cereal material on and off the platform scale and the operation of feeding the cereal material into and out of the washing container are quite labor intensive. Therefore, a difficulty is encountered in assigning a sufficient number of workers for such operations. This inherently causes rising labor costs and reduced cost-performance. Also, in order to avoid injuring or dampening of the cereal and removal of important nutritive substances during washing, substantial qualification and training of workers performing the washing operation becomes necessary. It is further required to skim out supernatant fluid only to remove washed out foreign matter during the washing process. In addition, the respective steps of measuring, transporting, washing and transporting are performed in a batch manner without unitary control, and thus it is difficult to improve overall efficiency.

Concerning the process of separation and screening of the roasted cereal, it is quite difficult to avoid overlooking of the burnt cereal by visual observation. Furthermore, this screening operation is quite cumbersome and labor intensive.

On the other hand, in the step of crushing the cereal requires a large scale cooling facility for preliminary cooling of the cereal. In addition, such preliminary cooling takes a relatively long period of time, thereby further degrading efficiency and productivity. Furthermore, during the crushing process a part of the crushed cereal powder tends to adhere or deposit on interior surfaces of the crushing machine or flow out upon discharge from the crushing machine. This can clearly lower the production yield. Accumulation of residual cereal powder within the crushing machine inherently causes the necessity of regular or periodic maintenance of the machine.

Additionally, between the process steps of washing, measuring, separating, screening and crushing, there is the necessity for transporting the cereal from one process station to the next. This further requires cumbersome loading operations associated with such transporting, thereby further lowering efficiency of the overall processes.

SUMMARY OF THE INVENTION

Therefore, it is an object of the present invention to provide a cereal powder production plant which can carry out washing, measuring, separating, screening and crushing processes successively in turn at respective steps or stations and which can combine the respective steps through transporting means for achieving improvement of production efficiency.

According to one aspect of the invention, a cereal power production plant comprises:

means for washing and measuring cereal material;

means for roasting cereal material passed through the washing and measuring means;

means for separating and screening from the roasted cereal carbonized substance generated during the roasting process in the roasting means;

means for connecting the roasting means to the separating and screening means for feeding the roasted cereal material;

means for crushing the cereal material separated and screened by the separating and screening means; and means for connecting the separating and screening means to the crushing means for feeding the roasted material from which the carbonized substance is removed.

In the construction set forth above, the means for connecting the roasting means to the separating and screening means and the means for connecting the separating and screening means to the crushing means may pneumatically transport the roasted cereal. On the other hand, the washing and measuring means may comprise a water circuit means for flowing water therethrough, a mixing portion in the water circuit means for mixing the cereal material with the flowing water, and a plurality of cereal receptacle containers arranged along the water circuit means downstream of the mixing portion and respectively communicated with the water circuit means. In this case, the water circuit means may be formed into a closed circuit for recirculating the water. Also, the water circuit means may be constructed to accumulate the water in an amount sufficient for filling up all of the cereal receptacle containers. Furthermore, each of the cereal receptacle containers may have an openable bottom lid for discharging the water and the cereal material from the container.

The production plant may further comprise a filtering means for removing foreign matter flowing with the water from the water circulating within the water circuit means.

Preferably, the separating and screening means comprises a separator for separating the carbonized substance from the roasted cereal and a pneumatic transporting pipe disposed between a container containing therein roasted cereal and the separator, to thus pneumatically transport the roasted cereal. In such case, the separator may comprise a centrifugal separation device for generating swirling flow of a fluid mixture of the roasted cereal and air, to thus separate the carbonized substance. Also, the production plant may further comprise a dust collector for collecting the carbonized substance separated and discharged through a discharge end of the centrifugal separation device.

It is also preferable that the crushing means comprise a crushing portion for crushing the cereal and forming a cereal powder, means for blowing cooling air toward the crushing portion to thus move downwardly or drop the cereal powder, and a transporting pipe for transporting the dropped cereal powder by means of transporting air.

According to another aspect of the invention, a production plant for producing a cereal powder comprises:

a supply hopper for metering a cereal material at a predetermined feed rate;

a water circulating system, defining a water flow path extending across a feed position to which the cereal material is supplied from the hopper, for circulating therethrough a mixture of the cereal material and water while removing foreign matter contained in the cereal material, the water circulating system including a water supply source for supplying water into the water flow path during processes of washing and dipping of the cereal material;

a plurality of cereal traps provided in communication with the mater flow path so as to introduce therein the mixture of the cereal material and water for maintaining the cereal material in water for a given period of time, thereby dipping the cereal material;

a strainer incorporated in the cereal traps for straining the cereal by separating water and cereal in the cereal traps;

a roaster for roasting the cereal washed and dipped in the cereal traps for a predetermined period of time;

means cooperated with the cereal trap for feeding the strained cereal material into the roaster;

a transporting means for carrying the roasted cereal discharged from the roaster by a carrier fluid;

a screening device associated with the transporting means for screening off a carbonized component from the roasted cereal utilizing a mass weight difference therebetween; and a crusher associated with the transporting means at a location downstream of the screening device for receiving the roasted cereal and crushing the latter for producing the cereal powder product.

In the preferred construction, the water circulating system has a mixing portion for mixing the cereal material and water for forming the mixture thereof, and the cereal traps are located downstream of the mixing portion. The water circulating system may include an inclined path portion at a location downstream of the mixing portion, and the plurality of the cereal traps are provided in spaced apart relationship to each other along the inclined path so that the cereal traps are filled in the order from an upstreammost trap to a downstreammost trap.

The water supply source preferably supplied water at a given flow rate adapted to flow the cereal material at a lower portion of the flow of the mixture to ensure introduction thereof into the upstreammost vacant cereal trap.

The cereal trap may have a normally closed bottom lid which is opened for discharging the washed and dipped cereal material after straining thereof. The strainer may permit communication between the cereal trap and the roaster while the bottom lid is held open.

According to a further aspect of the invention, a production plant for producing a cereal powder comprises:

a supply hopper for metering a cereal material at a predetermined feed rate;

a water circulating system defining a water flow path for circulating therethrough a mixture of said cereal material and water while removing foreign matters contained in said cereal material;

a plurality of cereal traps provided in communication with said water flow path so as to introduce therein the mixture of the cereal material and water for a given period of soaking or dipping;

a strainer incorporated in each cereal trap for separating water and cereal therein after expiration of the given dipping period;

a roaster for roasting the cereal washed and dipped in the cereal trap for a predetermined period of time;

a pneumatic transporting circuit for carrying the roasted cereal discharged from the roaster by carrier air;

a screening device associated with the pneumatic transporting circuit for screening off carbonized components from the roasted cereal utilizing a mass weight difference therebetween; and A crusher associated with the transporting circuit at a location downstream of the screening device for receiving the roasted cereal and crushing the latter for producing the cereal powder product.

The screening device may incorporate a centrifugal separator generating a strong swirl in the flow of the mixture of the roasted cereal and air carrying the carbonized component for separating the roasted cereal from the carbonized component utilizing the mass weight difference therebetween.

In the preferred construction, the production plant may further comprise a cooling air inlet defined in the pneumatic transporting circuit for introducing the cooling air to be blown toward the crusher for cooling the cereal being crushed. Also, the production plant may further comprise a transporting air inlet defined in the pneumatic transporting circuit for introducing a carrier air for transporting the cereal powder discharged from the crusher.

According to a still further aspect, a production plant for producing a rice powder comprises:

a washing station for washing rice material for removing foreign matters contained in the rice material, the washing station permitting the rice material to stay in a condition dipped in water for a given period of time for absorption of water in each individual rice grain, the washing station further permitting straining the water after the given period of time;

a roasting station for roasting the dipped rice transferred from the washing station while stirring the rice to provide uniform roasting;

a screening station receiving the roasted rice and a carbonized component in the roasted rice for differentiating by mass weight between the roasted rice and the carbonized component, the screening station separating the carbonized component from the roasted rice by screening off the former; and a crushing station receiving the roasted rice from the screening station and crushing respective individual grains of rice for forming the rice powder as a product.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

BRIEF DESCRIPTION OF THE PREFERRED EMBODIMENT

Figure 1:
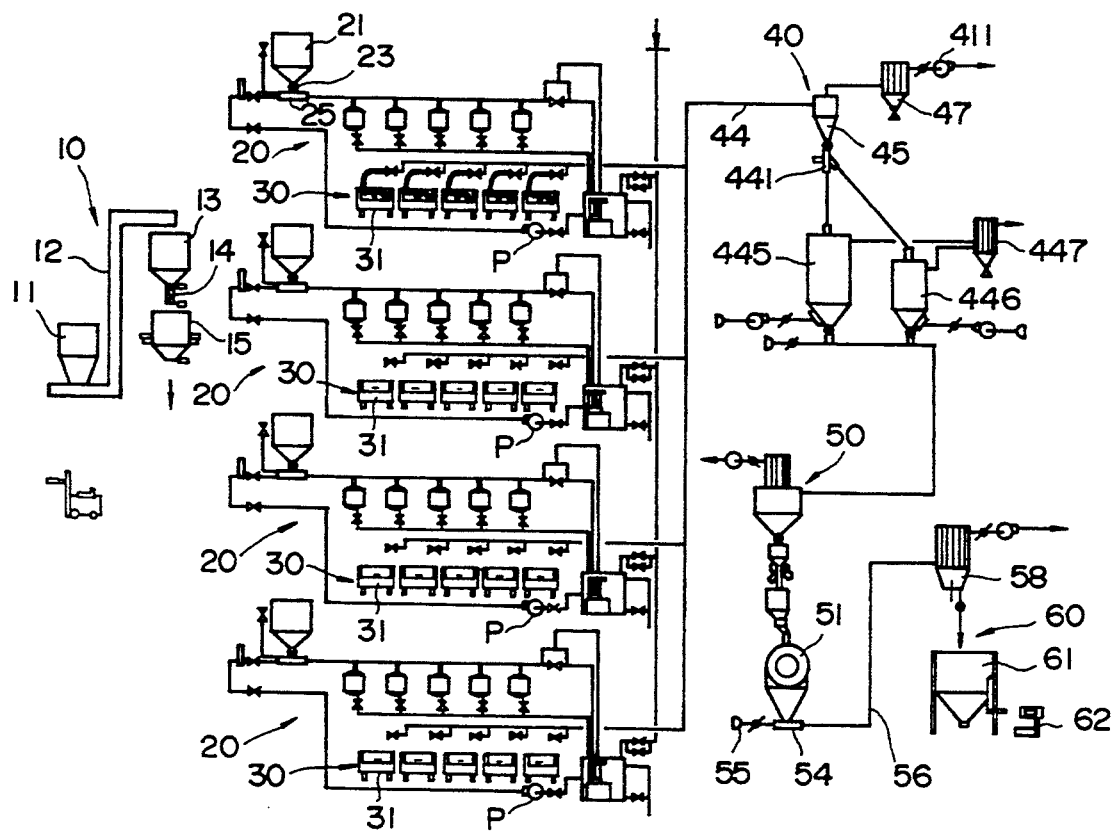
FIG. 1 is an explanatory illustration showing an overall construction of the preferred embodiment of a cereal powder production plant according to the present invention.

Referring now to the drawings, a preferred embodiment of a cereal powder production plant according to the present invention will be discussed hereinafter. In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessarily obscure the present invention.

Figure 2:
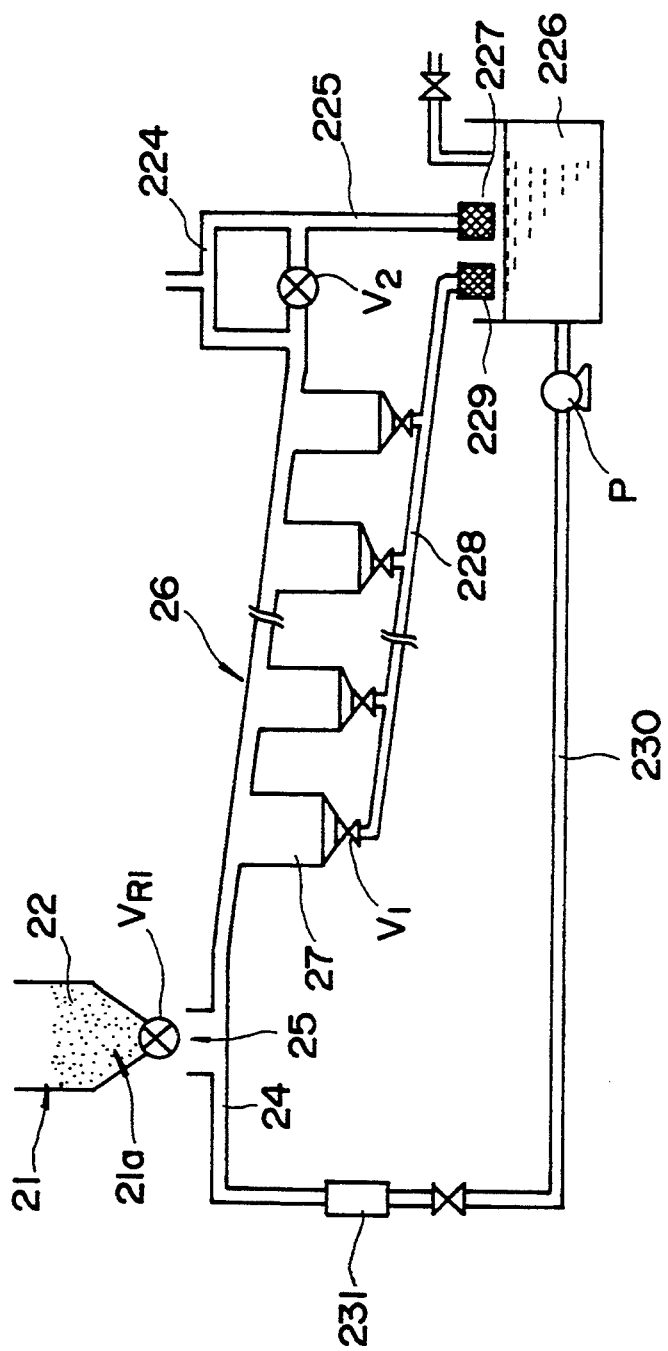
FIG. 2 is an explanatory illustration showing a washing and measuring step in the cereal powder production plant of FIG. 1.

In the drawings, FIG. 1 shows the overall construction of a preferred embodiment of a cereal powder production plant according to the present invention, and FIG. 2 shows a cereal material washing and measuring step employed in the preferred embodiment of the cereal powder production plant according to the invention.

As shown in FIG. 1, the preferred embodiment of the cereal powder production plant comprises a material supply station 10, a washing and measuring station 20, in which a plurality of (four in the shown embodiment) process lines are provided in mutually parallel relationship, a roasting station 30, in which a plurality of process lines are provided in mutually parallel relationship corresponding to the process lines in the washing and measuring station, a separating and screening station 40, toward which pass roasted cereals from the process lines of the roasting station, a crushing station 50 connected to the separating and screening station in series, and a product discharging station 60 connected to the crushing station in series. The following discussion will be given for each of the individual process stations in the order of the processes thereof.

Material Supply Station 10

The material supply station 10 includes a cereal material receptacle or container 11. The container 11 is adapted to receive therein a non-washed cereal material 22 (shown in FIG. 2: rice in the shown case, for example). A snake conveyor 12 is arranged to pass beneath the bottom of the container 11. The cereal material received in the container 11 drops onto the snake conveyer 12 and then is transported to an auxiliary measuring tank 13. A mass metering unit 14 is provided at the lower end opening of the auxiliary measuring tank 13. The mass metering unit 14 is adapted to distribute a predetermined amount of cereals from the auxiliary measuring tank 13 to a plurality of (only one is shown in FIG. 1) transporters 15.

Each transporter 15 is movable between the material supply station 10 and the washing and measuring station 20 for feeding the cereal material distributed thereto through the mass metering unit 14. Therefore, by the operation of the transporters 15, the cereal material is charged into hoppers 21 in respective washing and measuring station 20.

Washing and Measuring Station 20

In the washing and measuring station 20, four process lines are arranged in parallel relationship to each other as shown in FIG. 1. Since respective process lines are constructed to have the identical construction to the others, detailed discussion will be given for only one process line with reference to FIG. 2.

As set forth above, the hopper 21 receives the cereal material 22 transported by the transporter 15 and accumulates the same. The hopper 21 has an open bottom 21a, at which a rotary metering valve $V_{RI}$ is provided. The cereal material in the hopper 21 is fed by gravity downwardly therein and reaches the rotary metering valve $V_{RI}$. The rotary metering valve $V_{RI}$ is designed to meter the cereal material so that the cereal material may be discharged therethrough at a predetermined rate. A water circulation circuit 24 is arranged beneath the rotary metering valve $V_{RI}$ to receive the metered cereal material. Within the water circulation circuit 24 is circulated water by means of a water pump P which will be discussed later. In the shown embodiment, the water circulation circuit 24 forms a normally closed water circuit for constantly circulating the water. Therefore, fresh water need be supplied to the water circulation circuit 24 only upon necessity.

A mixing portion 25 is provided at an appropriate position in the water circulation circuit 24 for mixing the cereal material supplied from the rotary metering valve $V_{RI}$ with the circulating water. The cereal material mixed with the circulating water in the mixing portion 25 is carried by the water flow in a downstream direction. During this process, foreign matters (such as flue, dead insects, chaff and so forth) which are lighter than water, are separated from the cereal material 22 and flow on the surface of the circulating water.

An inclined piping 26 of the water circulation circuit 24 provided at the downstream side of the mixing portion 26 descends slightly for facilitating downward flow of the mixture of the water and the cereal material. A plurality of cereal amount measuring tanks 27 forming cereal collecting containers are provided in communication with the bottom of piping 26 in mutually spaced apart relationship in the flow direction. Therefore, while the mixture of the cereal and water passes through the piping 26, the cereal flowing in the lower part of the flow may flow into the upstreammost measuring tank 27.

When such upstreammost measuring tank 27 becomes full, the cereal in the mixture begins to flow into the next upstream measuring tank 27. In a similar manner, the measuring tanks 27 are filled in order from the upstream side. During this process, the foreign matters removed from the cereal float on the water and flow in the downstream direction without passing to tanks 27. Needless to say, the amount of the water filled into the water circulation circuit 24 should be sufficient for filling all the cereal amount measuring tanks 27.

Figure 3:
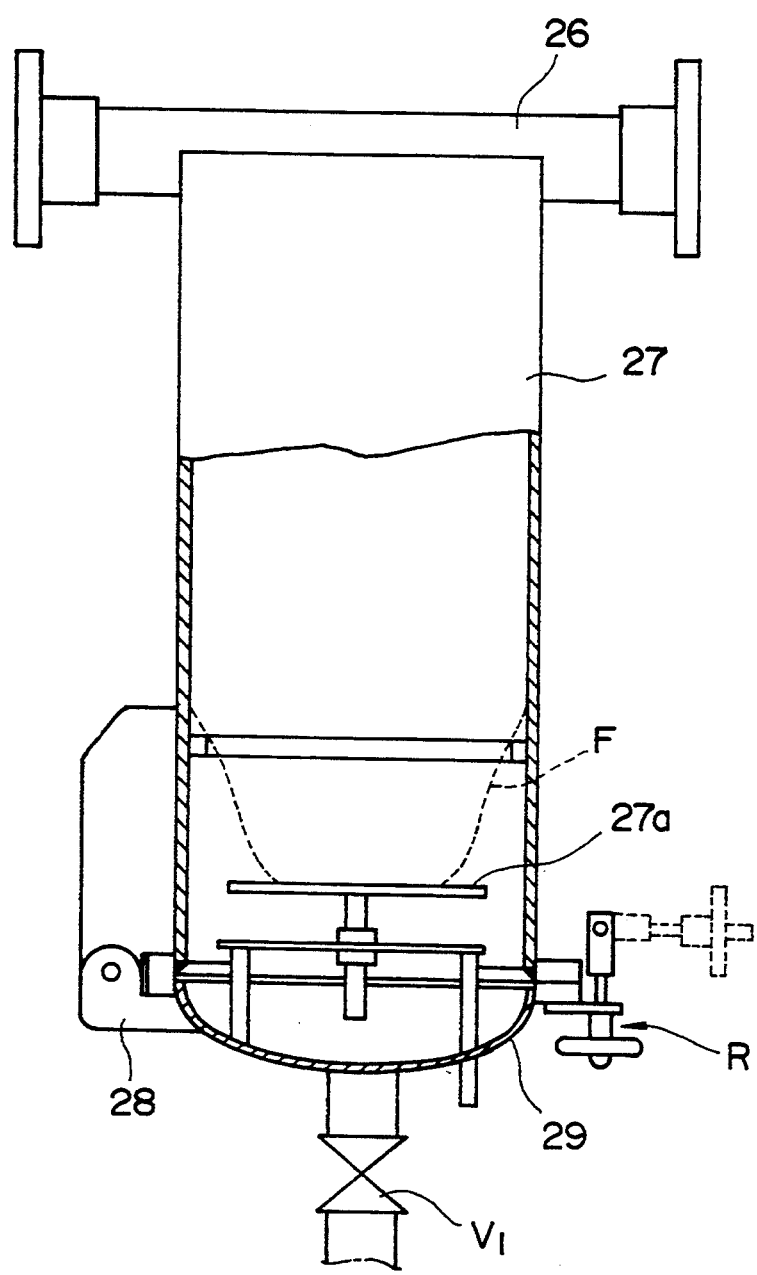
FIG. 3 is a partially cut away sectional view of a cereal metering tank to be employed in the washing and measuring step of FIG. 2.

FIG. 3 is an explanatory illustration showing a principle of the cereal amount measuring tank 27. The tank 27 is provided at a lower portion thereof with a bottom lid 29 supported by a support or flange 28. The bottom lid 29 incorporates a drainage valve VI for permitting drainage of water accumulated at the bottom of the tank. Within the tank 27 is disposed a height adjustable bottom plate 27a. On the adjustable bottom plate 27a is positioned or mounted a filter F having a mesh size to pass foreign matters having smaller grain size than the individual cereal grains. By the effect of this filter, the small grain size foreign matters having greater specific weight than the water, such as sand, small stone and so forth, are passed into the bottom of the tank 27 and then discharged together with the water in the bottom of the tank. The bottom lid 29 is associated with a lock mechanism R for locking the bottom lid at open and closed positions.

Figure 4:
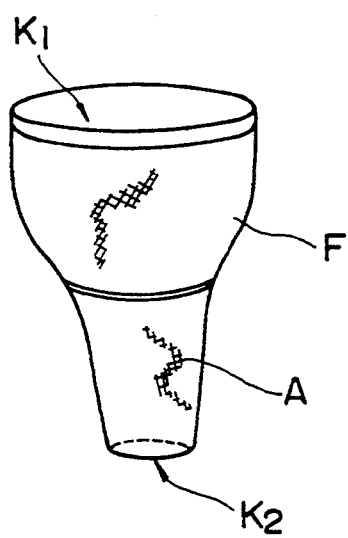
FIGS. 4(a) and 4(b) are perspective views showing a filter within the cereal metering tank of FIG. 3.
Figure 4:
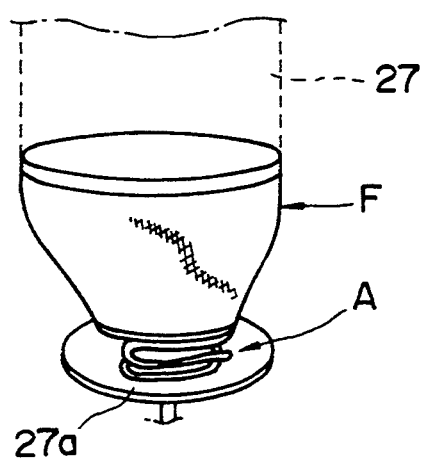

FIGS. 4(a) and 4(b) show one example of the filter F provided within the cereal amount measuring tank 27. As shown in FIG. 4(a), the filter F has a larger upper portion defining opening K1 and having substantially the same diameter as the internal diameter of the cereal amount measuring tank 27 and a conico-cylindrical mesh portion A which connects the larger upper portion and a smaller bottom opening K2 and thus reducing the diameter toward the smaller opening. The mesh portion A may be formed of various materials. However, in the shown embodiment, the mesh portion A is formed of tetron (tradename: Teijin K.K.) fiber. Then, as shown in FIG. 4(b), the outer circumference of the larger portion is tightly secured on the inner surface of the tank 27. Then, the lower mesh portion A is mounted on the bottom plate 27a in folded condition so that the cereal may not flow out through the smaller opening K2.

A dipping control valve V2 is provided at the lower end portion of the inclined piping 26, as shown in FIG. 2. The dipping control valve V2 is designed such that when the dipping control valve V2 is closed, the interior of the inclined piping 26 is filled with water. Accordingly, by adjusting time periods of the opening and closing the dipping control valve V2, the time periods during which the cereal is immersed or dipped in water in the plurality of tanks 27 can be adjusted. Thus, the cereal can be dipped for a predetermined period of time. An overflow pipe 224 bypassing the dipping control valve V2 serves for preventing the water level in the inclined piping 26 from rising above the water level in the mixing portion 25. A downstream side water circulation circuit 225, which receives water flow passed through the dipping control valve V2 or the overflow pipe 224, extends into the upper portion of a reservoir tank 226. A dust removing filter 227 is provided at the outlet of the circuit 225 for removing foreign matters and thus passes only water.

A strainer pipe 228 guides the water discharged from the cereal amount measuring tanks 27 into the water reservoir tank 226. On the other hand, at the outlet port of the strainer pipe 228 is provided a dust removing filter 229 serving as a filter means.

The pump P is adapted to energize the water in the water reservoir tank 226 to circulate the water into the mixing portion 25 through a condensation pipe 230. At an appropriate portion in the condensation pipe 230 is provided a flow meter 231.

In the washing and measuring step in the shown embodiment, the cereal material 22 charged into the hopper 21 is fed through the rotary metering valve $V_{RI}$ into the mixing portion to be mixed with the water flowing through the water circulation circuit 24. Then, the mixture of the cereal material 22 and the water flows through the inclined piping 26. During flow through the piping 26, the cereal material 22 is washed by the water and thus foreign matters having a specific weight lighter than the water floats on the flow without falling into one of the cereal amount measuring tanks 27. On the other hand, the cereal material 22 having greater specific weight than the water flows along the bottom of the piping 26 and flows into the upstreammost vacant cereal amount measuring tank 27. Through this process, the cereal amount measuring tanks 27 are filled with the cereal material 22 in the order from the upstream side. Namely, when the vacant upstreammost measuring tank 27 becomes full, the cereal material 22 in the flow of the mixture begins to fall into the next upstream measuring tank 27. The cereal material 22 flowing into the measuring tank 27 is separated from the water by means of the filter F provided in the tank. Namely, the water and foreign matters having smaller grain sizes than the cereal material 22 flows through the filter F toward the bottom of the tank 27. Accordingly, when one measuring tank 27 is filled up and thus becomes full, it means that a predetermined volume defined by the bottom plate 27a, which is set at a predetermined height relative to the bottom of the tank, and the upper end of the tank is filled with cereal material 22. Then, the metering or measurement of the volume of the cereal material of the filled tank 27 is completed. On the other hand, the water and the small grain size foreign matters passed through the filter F are drained through the strainer valve V1 and a strainer piping 228 to be recirculated into the water reservoir tank 226. During this travel, the water and the foreign matter pass through dust removing filter 229. The cereal material 22, which has achieved absorption of a predetermined amount of water during storage in the measuring tank 27, can be discharged from the tank 27 by opening the bottom lid 29. Thereafter, the cereal material, for which the washing and measuring processes are completed, is fed to the subsequent, roasting station 30.

On the other hand, the water passed through the piping 26 flows through either the dipping control valve V2, when in the open condition, or the overflow pipe 224. Thereafter, the water is recirculated into the water reservoir tank 226 via the downstream side water passage 225 and through the dust removing filter 227. The water in the water reservoir tank 226 is energized by the pressure supplied from the pump P and thus is recirculated into the mixing portion 25 via the condensation pipe 230.

In the practical process, initially the pump P is started to circulate water through the water circulation circuit 24. The flow rate of the water circulating in the water circulation circuit may be selected so as to ensure dropping of the cereal together with the water into the upstreammost vacant cereal amount measuring tank 27. While the water is circulated in the water circulation circuit, washing of the cereal material 22 is performed. During such washing process, the strainer valve V1 is open and the dipping control valve V2 is closed. Therefore, at such condition, the water is mainly circulated through the cereal amount measuring tanks 27, the strainer valves V1 and the strainer pipe 228. Any extra amount of water circulated through the piping 26 recirculates to the reservoir tank 226 via the overflow pipe 224. At this condition, the cereal metering valve $V_{RI}$ is operated to feed the cereal material 22 into the water circulation circuit. The feeding rate of the cereal material is controlled by the cereal metering valve $V_{RI}$ in relation to the flow rate of the water in the water circulation circuit. The cereal material 22 falls into the mixing portion 25, in which the cereal material is mixed with the water to form a mixture. In general, the cereal material has greater specific weight than the water so that the cereal material will form the lower part of the mixture flow.

As set forth above, during flow of the mixture through the inclined piping 26, the cereal material with a certain amount of water drops into the cereal amount measuring tanks 27 in the order from the upstreammost tank to the downstreammost tank. The water flowing into the cereal amount measuring tanks 27 is drained through the open strainer valves V1. When one process unit of cereal material 22 is completely fed or all of the cereal amount measuring tanks 27 become full, the operation then moves to the dipping process.

In the dipping process, respective strainer valves V1 are closed and the dipping control valve V2 is operated to partially open to adjust the amount of water in the piping 26 so that all cereal material 22 in the cereal amount measuring tanks 27 is fully dipped or immersed in water. This condition is maintained for a given dipping period. In case of the shown embodiment which processes rice, the dipping period may be approximately thirty minutes.

After expiration of the dipping period, the strainer valves V1 and the dipping control valve V2 are opened and the pump P is stopped so that all of the water passes to the water reservoir tank 226. During this process, the water accumulated in each of the cereal amount measuring tanks 27 is drained, thereby straining the cereal material. When straining of the cereal material 22 is completed, the lock mechanism R for the bottom lid 27 is released from the locking position to permit the bottom plate 27a to pivot with lid 29 into the open position. At this condition, the mesh portion A of the filter F is unfolded or expanded so that the lower smaller opening K2 is open to the inlet of the roasting station.

Here, it should be noted that although the roasting station 30 is illustrated in a position horizontally offset from the washing and measuring station 20 in FIG. 1, the roasting station 30 in practice is placed just beneath the washing and measuring station 20, so that the mesh portion A of the filter F will allow the smaller opening K2 to reach the inlet of the roasting station.

By connection of the smaller diameter portion of the filter F to the inlet of the roasting station, the cereal material 22 which has absorbed water is fed into the roasting station 30.

Roasting Station 30

As shown in FIG. 1, a plurality of roasters or roasting ovens 31 are provided correspondingly to the cereal amount measuring tanks 27 in the washing and measuring station 20. The cereal material 22 which is discharged from a tank 27 by opening the bottom lid 29 thereof, are subjected to a roasting process at a predetermined temperature for a predetermined period of time. After expiration of the predetermined roasting period, the roasted cereal is removed from respective roasters 31.

For performing roasting of the cereal fed into the roasting station 30, various roasting equipment may be employed. However, it is preferred to employ a roasting equipment of the type disclosed in Japanese Unexamined Patent Publication No. 60-176553, published on Sep. 10, 1985, which is commonly owned. As well, the roasting process discussed in the above-identified publication is preferably employed, though various other roasting processes can be employed.

In summary, each roasting station 30 includes a roasting oven which has a sectionally elliptical configuration. The configuration of the roasting oven illustrated and discussed in the above-identified Japanese Unexamined Patent Publication is preferred for high uniformity roasting of the cereal. However, any appropriate configuration which permits repeated or periodic stirring of the cereal in the oven for uniform roasting equally may be employed.

In the case that the cereal to be processed is rice, the roasting process is performed in the manner set out below. Initially, rice as the cereal material and having absorbed water in the dipping step is filled into the roasting oven in an amount of $\frac{1}{3}$ to $\frac{1}{2}$ of the volume capacity of the oven. The amount may be variable in any way depending upon necessity. However, the above-identified amount relative to the volume of the oven is chosen in view of stirring performance. The roasting oven may be heated so as to elevate the temperature of the rice in the roasting oven to a temperature of approximately 150° to 200°. The oven is driven to rotate at a speed of approximately 15 r.p.m.

The disclosure of the above-identified Japanese Unexamined Patent Publication No. 60-176553 is herein incorporated by reference.

Separating and Screening Station 40

Figure 5:
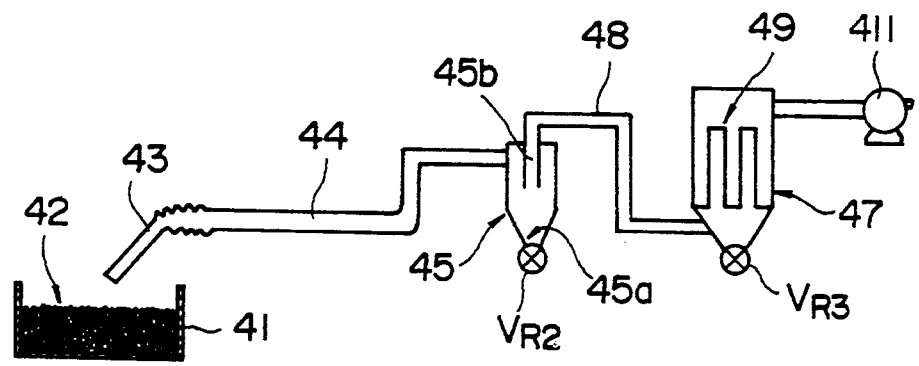
FIG. 5 is an explanatory illustration showing a separating and screening step in the cereal powder production plant of FIG. 1.
Figure 6:
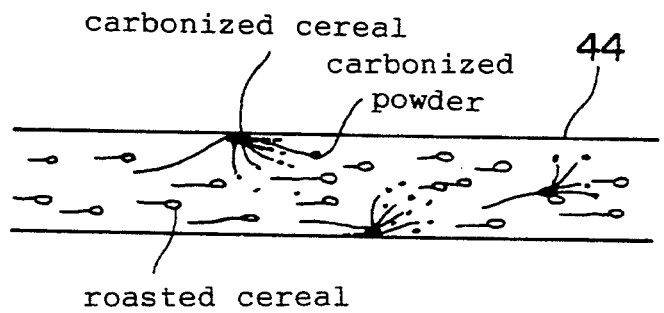
FIG. 6 is an explanatory illustration diagrammatically showing the behavior of cereals and carbonized cereals during pneumatic transportation in the separating and screening step.

The overall construction of the separating and screening station employed in the shown embodiment of the production plant of the present invention is illustrated in FIG. 5. The behavior of the cereal and carbonized cereal in the separating and screening station 40 during a pneumatic transportation is shown in FIG. 6.

In the separating and screening station 40 shown in FIG. 5, a stocker 41 represents a receptacle or container for receiving therein the cereal material 42, for which the roasting process is completed. The stocker 41 can be the roasting oven in the roasting station, in which the roasted cereal material 42 is filled.

A suction portion 43 in the separating and screening station draws by vacuum the roasted cereal 42 in the stocker 41 into a pneumatic transportation pipe 44.

The roasted cereal 42 introduced into the pneumatic transportation pipe 44 by the suction portion 43 is carried by air flow through the pneumatic transportation pipe 44. During travel along the pneumatic transportation pipe, carbonized substances, such as carbonized cereal, chaff and so forth, and having smaller specific gravity than the cereal 42 collide with the inner periphery of the pipe or other cereal. Through this operation, the carbonized substances which were generated during the roasting process become lighter and brittle and are crushed into fine powder by colliding with the inner periphery of the pipe 44 and other cereals. Therefore, utilizing difference of grain size and mass weight, the cereal can be easily separated and screened from the carbonized substances. Furthermore, since the pneumatic transportation pipe 44 is connected to a cyclone type separator 45 which is a centrifugal separation device, transportation of the roasted cereal from the roasting station 30 to the separating and screening station 40 can be performed automatically.

The cyclone type separator 45 provides strong swirling flow to the mixture of the air, the roasted cereal and the carbonized substance within the interior space thereof. Due to differences of mass weight, the air, the cereal and the carbonized substance are separated within the separator 45. Namely, the roasted cereal which has relatively large mass weight falls into the bottom portion 45a of the separator 45, while relative lighter carbonized substances and the air are discharged out of the separator through a ventilation opening 45b. The roasted cereal accumulated in the bottom of the separator 45a is discharged through a rotary valve $V_{R2}$.

A dust collector 47 draws the fluid mixture of the air and the carbonized substance discharged through the ventilation opening 45b via a discharge pipe 48. Then, the carbonized substance is separated from the air by an internally provided filter 49. The carbonized substance collected in the bottom of the dust collector 47 by the action of the filter 49 is discharged through a rotary valve $V_{R3}$. On the other hand, the air separated from the carbonized substance is ventilated to the atmosphere from the dust collector 47. This separating and screening process contributes to removal of the carbonized substance from the cereal to be introduced into the crushing station 50, thus eliminating bitter tasting substance from the powder product which is produced through the crushing process.

As will be appreciated, a suction blower 411 is provided for introducing vacuum pressure into the suction portion 43, the pneumatic transportation pipe 44, the dust collector 47 and the discharge pipe 48.

It should be noted that two-way damper 441 shown in FIG. 1 is adapted to distribute the roasted cereal 42 accumulated in the bottom of the separator 45 into stockers 445 and 446, selectively depending upon the roasting period.

Crushing Station 50

Figure 7:
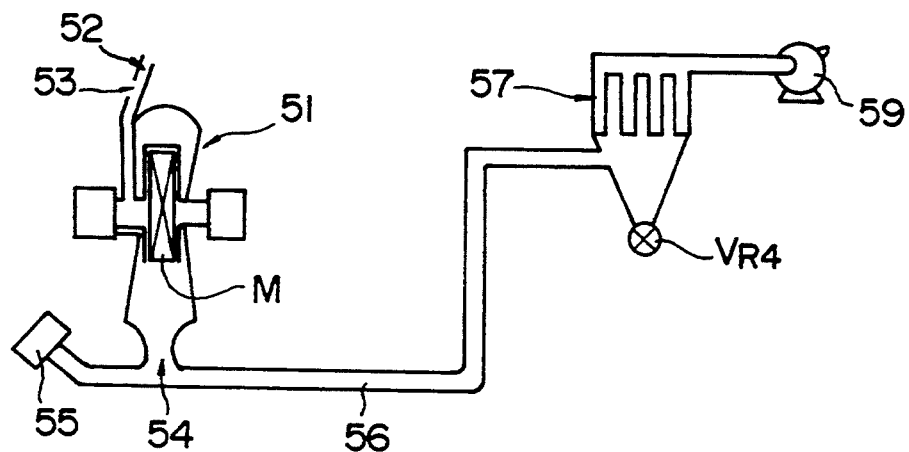
FIG. 7 is an explanatory illustration showing a crushing step in the cereal powder production plant of FIG. 1.

FIG. 7 shows the crushing station 50 with its own air cooling means and an air transporting means, employed in the preferred embodiment of the production plant of the present invention.

In the crushing station 50 illustrated in FIG. 7 a crusher body 51 includes a supply passage 52 communicating with the stockers 445 and 446 for the roasted cereal 42, and a mill M as a crushing means. The mill M crushes the cereal supplied from the supply passage 52 by mechanical pressure.

An air inlet 53 provided at a mid-way point of the supply passage 52 introduces air at a predetermined pressure into the supply passage 52 due to suction caused by a suction blower 59.

Crushed cereal powder flows down immediately after crushing into a dropping section 54 positioned below the ill M by the effect of an air current caused by blower 59. On the other hand, air is introduced into a transportation pipe 56 through an air inlet 55 to merge at section 54 with the air flow from the mill M. At the air inlet 55, similarly to the air inlet 53 of the supply passage 52, the air is introduced at a given pressure by the effect of the suction blower 59.

The transportation pipe 56 is communicated with both of the mill M and the air inlet 55 and is designed to transport the cereal powder collected in the dropping section 54 by mixing with a cooling air and a carrier air. Namely, in the transportation pipe 56, the external fresh air introduced through the air inlet 53 is mixed with the air carrying the cereal powder from the mill M. This arrangement enhances transportation of the cereal powder as well as cooling of the powder. Furthermore, such construction may avoid accumulation of the cereal powder in the dropping section 54.

A preferred ratio of the volume of cooling air introduced through the air inlet 55 and the volume of transporting or carrier air introduced through the transporting air inlet 53 is 0.75 (cooling air):1.00 (transporting air) in an experiment. However, such ratio should not be considered a requirement, but may be variable depending upon environmental conditions.

The mixture of the air and the cereal powder transported through the transportation pile 56 is separated into air and cereal powder by means of a collector 57. The cereal powder is then accumulated in the bottom of the collector 57 and only air is discharged through the collector. The cereal powder accumulated in the bottom of the collector 57 as the product is discharged from the collector through a rotary valve $V_{R4}$.

In the crushing station 50 employed in the shown embodiment of the production plant, heat generated during crushing of the cereal in the mill M is generally removed by the air blown with the cereal. By this, in the shown embodiment, elevation of the temperature of the cereal in the mill M can be suppressed to be on the order to 6° C.

Product Discharging Station 60

A product tank 61 employed in the product discharging station 60 in the shown embodiment in FIG. 1 receives the cereal powder product discharged downwardly from the rotary valve $V_{R4}$ of the collector 57. The cereal powder product taken out from the product tank 61 is measured by a platform scale 62 and delivered as a product.

As set forth above, according to the preferred embodiment of the cereal powder production plant of the present invention, the cereal material is transported from the material supply station 10 to the washing and measuring station 20 by means of the transporter 15. Then, the cereal material is fed from the cereal amount measuring tanks 27 of the washing and measuring station 20 to the roasting station 30 after washing, measuring and dipping processes. The roasted cereal is pneumatically transported into the separating and screening station 40 so that carbonized substance can be removed therein. Then, the roasted cereal is further transported pneumatically to the crushing station 50. In the crushing station 50, the cereal powder produced therein is pneumatically transported to the product discharging station 60 with the product being cooled during travel, and then is collected in the product tank 61. Accordingly, the shown embodiment achieves significant efficiency in the process for producing the cereal powder.

As set forth above in detail, according to the present invention, the cereal powder production plant may be a unitary production plant. Therefore, the process of production of the cereal powder can be unitarily managed and controlled for gaining significantly higher production efficiency.

Also, since the pneumatic transportation means is employed between the roasting means and the selecting and screening means, the roasted cereal can be transported or introduced into the separating and screening means automatically without requiring any manual operation. This contributes to improvement of production efficiency as well as to saving of labor costs.

Furthermore, since the cereal material supplied from the cereal material supply means is mixed with water circulated in the water circulating circuit at the mixing portion and is collected in the cereal accumulating containers or tanks provided in spaced apart relationship along the circuit, the cereal material can be filled into the cereal accumulating containers in order from an upstreammost container during travel through the water circulating circuit. Therefore, washing and measuring of the cereal material can be performed simultaneously.

At this time, it may be possible to form the water circulating circuit as a closed circuit to reduce the amount of water to be used in the process. This may permit saving of production costs. Furthermore, by providing the water in an amount sufficient to fill up the cereal accumulating containers, the cereal may be dipped within the water for a given period of time. Therefore, in addition to the washing and measuring processes, a dipping process can be performed simultaneously. Furthermore, in the shown embodiment, the filter in the straining means incorporated into the cereal accumulating container may serve as a passage for introducing the washed and measured cereal material into the roasting means. This facilitates transportation of the washed and measured cereal material from the washing and measuring means to the roasting means.

Also, since the shown embodiment employs transporting means for pneumatically transporting the roasted cereal between the container and the separating means, the roasted cereal containing carbonized substances can be transported automatically. Further, during such transportation, light and brittle carbonized substances are crushed by collision with the inner periphery of the transportation passage and other cereal to become fine powder to float in the air flow. Therefore, separation of the roasted cereal and the carbonized substances in the separating means is facilitated. This ensures avoidance of the carbonized substance, which possibly provides a bitter taste, from being introduced into the crushing means.

As discussed, because of a difference of mass weight between the roasted cereal and the carbonized substance, separation of the roasted cereal from the carbonized substance can be easily performed by a centrifugal separator machine. Furthermore, in the shown embodiment, since the carbonized substance separated in the separating means is collected by the dust collector, the fine particles of the carbonized substance will not be discharged to the atmosphere, thus protecting the environment.

Furthermore, since the show embodiment introduces the roasted cereal into the crushing means together with the blown air, the carrier air may serve as a cooling medium during the cereal crushing operation, to thus suppress elevation of the temperature of the cereal. In addition, according to the shown embodiment, since the cooling air is introduced and mixed with the carrier air carrying the cereal, cooling of the cereal powder discharged from the crushing means can be efficiently performed.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A cereal powder production plant comprising:
   means for washing and measuring cereal material;
   means for roasting the cereal material passed through said washing and measuring means;
   means for separating and screening from the roasted cereal a carbonized substance generated during the roasting process in said roasting means;
   means for connecting said roasting means to said separating and screening means for feeding the roasted cereal material;
   means for crushing the cereal material separated and screened by said separating and screening means; and
   means for connecting said separating and screening means to said crushing means for feeding the roasted material from which the carbonized substance is removed.

2. A production plant as set forth in claim 1, wherein said means for connecting said roasting means said separating and screening means and said means for connecting said separating and screening means to said crushing means pneumatically transports the cereal.

3. A production plant as set forth in claim 1, wherein said washing and measuring means comprises a water circuit means for flowing water therethrough, a mixing portion in said water circuit means for mixing the cereal material with the flowing water, a plurality of cereal receptacle containers arranged along the water circuit means downstream of said mixing portion and respectively communicated with said water circuit means.

4. A production plant as set forth in claim 3, wherein said water circuit means is formed into a closed circuit for recirculating the water.

5. A production plant as set forth in claim 3, wherein said water circuit means is constructed to accumulate the water in an amount sufficient for filling up all of said cereal receptacle containers 6. A production plant as set forth in claim 3, wherein each of said cereal receptacle containers has an openable bottom lid for discharging the water and the cereal material from said container.

7. A production plant as set forth in claim 3, which further comprises a filtering means for removing foreign matter flowing with the water from the water circulating within the water circuit means.

8. A production plant as set forth in claim 1, wherein said separating and screening means comprises a separator for separating the carbonized substance from the roasted cereal and a pneumatic transporting pipe disposed between a container containing the roasted cereal therein and said separator for pneumatically transporting the roasted cereal.

9. A production plant as set forth in claim 8, wherein said separator comprises a centrifugal separation device for generating swirling flow of the fluid mixture of the roasted cereal and air for separating the carbonized substance lighter than the cereal from the roasted cereal.

10. A production plant as set forth in claim 9, which further comprises a dust collector for collecting the carbonized substance separated and discharged through a discharge end of said centrifugal separation device.

11. A production plant as set forth in claim 1, wherein said crushing means comprises a crushing portion for crushing the cereal and forming a cereal powder, means for blowing cooling air toward said crushing portion for discharging the cereal powder, and a transporting pipe for transporting the discharged cereal powder by transporting air.

12. A production plant for producing a cereal powder and comprising:
   a supply hopper for metering a cereal material at a predetermined feed rate;
   a water circulating system, defining a water flow path extending across a feed position to which the cereal material is supplied from said hopper, for circulating a mixture of the cereal material and water therethrough while removing foreign matters contained in the cereal material, said water circulating system including a water supply source for supplying water into said water flow path during a process of washing and dipping the cereal material;
   a plurality of cereal traps provided in communication with said water flow path so as to introduce therein the mixture of the cereal material and water for maintaining the cereal material with water for a given period of dipping;
   a strainer incorporated in said cereal traps for separating water and cereal in said cereal traps;
   a roaster for roasting the cereal washed and dipped in said cereal trap for a predetermined period of time;
   means cooperated with said cereal traps for feeding the strained cereal material into said roaster;
   a transporting means for carrying the roasted cereal discharged from said roaster by a carrier fluid;
   a screening device associated with said transporting means for screening off a carbonized component from the roasted cereal utilizing mass weight difference therebetween; and
   a crusher associated with said transporting means at a location downstream of said screening device for receiving the roasted cereal and crushing the latter for producing the cereal powder product.

13. A production plant as set forth in claim 12, wherein said water circulating system has a mixing portion for mixing the cereal material and water for forming the mixture thereof, and said cereal traps are located downstream of said mixing portion.

14. A production plant as set forth in claim 13, wherein said water circulating system includes an inclined path portion at a location downstream of said mixing portion, and said plurality of said cereal traps are provided in spaced apart relationship to each other along said inclined path so that said cereal traps are filled in order from an upstreammost said trap toward a downstreammost said trap.

15. A production plant as set forth in claim 14, wherein said water supply source supplies water at a given flow rate adapted to flow the cereal material at a lower portion of the flow of the mixture for assuring introduction into an upstreammost vacant said cereal trap.

16. A production plant as set forth in claim 15, wherein said cereal trap has a normally closed bottom lid which is opened for discharging the washed and dipped cereal material after straining.

17. A production plant as set forth in claim 16, wherein said strainer permits communication between said cereal trap and said roaster while said bottom lid is held open.

18. A production plant for producing a cereal powder and comprising:
   a supply hopper for metering a cereal material at a predetermined feed rate;
   a water circulating system defining a water flow path for circulating a mixture of the cereal material and water therethrough while removing foreign matters contained in the cereal material;
   a plurality of cereal traps provided in communication with said water flow path so as to introduce therein the mixture of the cereal mixture and water for a given period of dipping;
   a strainer incorporated in each said cereal trap for separating water and cereal in said cereal trap after expiration of said given dipping period;
   a roaster for roasting the cereal washed and dipped in said cereal trap for a predetermined period of time;
   a pneumatic transporting circuit for carrying the roasted cereal discharged from said roaster by carrier air;
   a screening device associated with said pneumatic transporting circuit for screening off a carbonized component from the roasted cereal utilizing mass weight difference therebetween; and
   a crusher associated with said transporting circuit at a location downstream of said screening device for receiving the roasted cereal and crushing the latter for producing the cereal powder product.

19. A production plant as set forth in claim 18, wherein said screening device incorporates a centrifugal separator generating a strong swirl in the flow of the mixture of the roasted cereal and air while carrying the carbonized component for separating the roasted cereal from the carbonized component utilizing the mass weight difference therebetween.

20. A production plant as set forth in claim 18, which further comprises a cooling air inlet defined in said pneumatic transporting circuit for introducing cooling air to be blow toward said crusher for cooling the cereal being crushed.

21. A production plant as set forth in claim 20, which further comprises a transporting air inlet defined in said pneumatic transporting circuit for introducing carrier air for transporting the cereal powder discharged from said crusher.

22. A production plant for producing a rice powder and comprising:

a washing station for washing rice material for removing foreign matters contained in the rice material, said washing station permitting the rice material to stay in a condition dipped in water for a given period for absorption of water into each individual rice grain, said washing station further permitting straining water after said given period;

a roasting station for roasting the dipped rice transferred from said washing station while stirring the rice for uniform roasting;

a screening station receiving the roasted rice and carbonized component in the roasted rice for differentiating a mass weight between the roasted rice and the carbonized component, said screening station separating the carbonized component from the roasted rice for screening off the former; and a crushing station receiving the roasted rice from said screening station and crushing respective individual grains of said rice for forming the rice powder as a product.

* * * * *